Jan. 24, 1967                 G. PARISOT                 3,300,279
PROCESS FOR PRODUCTION OF HYDROFLUORIC ACID FROM
SULPHURIC ACID, FLUORSPAR AND ANHYDRITE
Filed Jan. 27, 1964
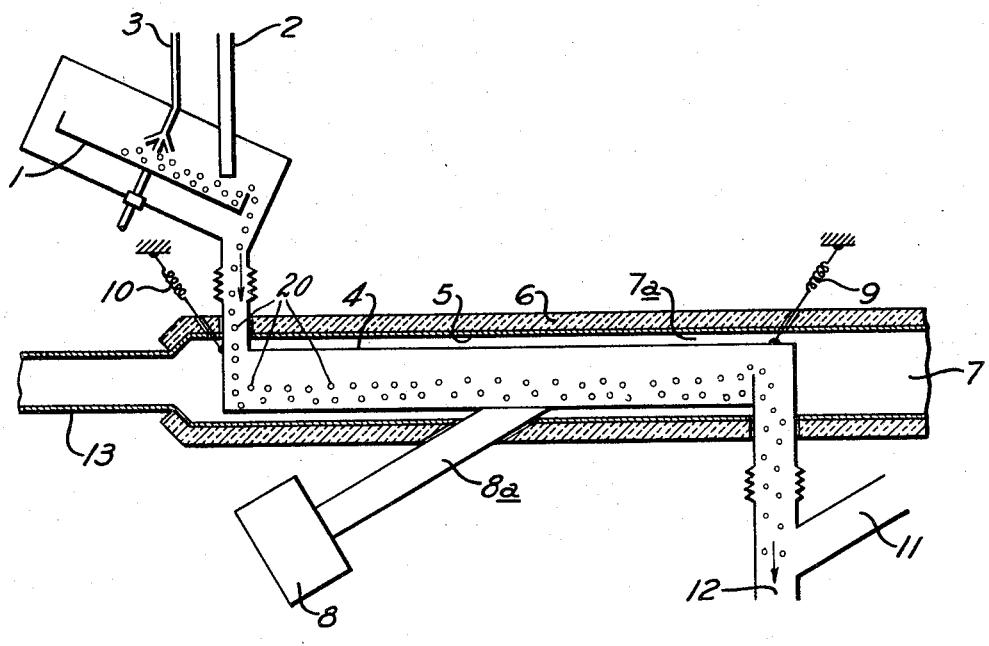
INVENTOR.
*GERARD PARISOT.*
BY
*Webb, Mackey + Burden*
ATTORNEYS.

United States Patent Office 3,300,279
Patented Jan. 24, 1967

3,300,279
PROCESS FOR PRODUCTION OF HYDROFLUORIC ACID FROM SULPHURIC ACID, FLUORSPAR AND ANHYDRITE
Gerard Parisot, Lyon, France, assignor to Societe d'Electro-Chimie, d'Electro-Metallurgie et des Acieries Electriques d'Ugine, Paris, France, a corporation of France
Filed Jan. 27, 1964, Ser. No. 340,149
Claims priority, application France, Jan. 30, 1963, 923,109; Dec. 26, 1963, 958,456
11 Claims. (Cl. 23—153)

This invention relates to improvements in processes for production of hydrofluoric acid from sulphuric acid and fluorspar.

It is known that the processes in which sulphuric acid and fluorspar are directly and continuously introduced into a hot reaction furnace for manufacture of hydrofluoric acid present a number of disadvantages. For example, the two reagents do not mix instantaneously so that the sulphuric acid, as soon as it is sufficiently hot, rapidly corrodes the furnace walls to such an extent that the maintenance of the furnace is expensive. Then, the reaction mixture may solidify. To overcome this disadvantage, mechanical devices are placed in the reaction furnace in order to stir the mixture. However, on the one hand, these devices only partially prevent the formation of a solid layer which adheres to the furnace wall and thereby reduces thermal exchange through the wall, and, on the other hand, they tend to homogenize the products inside the reaction furnace. Homogenization interferes with reaction kinetics which prefer a systematic treatment, thereby stay of the reaction mixture in the furnace is increased to achieve a compete reaction. Consequently, a larger capacity furnace is required.

Furthermore, it is known that preferred heat exchange with a solid includes use of a gas as a transmission agent and employment of the solid in a divided form rather than in a compact mass. Thus, it has been proposed to introduce into the reaction furnace a mixture of fluorspar and sulphuric acid in a relatively divided form.

Some processes partially realize the foregoing by carrying out the reaction in two stages. During a first stage, sulphuric acid and fluorspar, to which is eventually added an inert product, are mixed in a device wherein a noticeable part of the reaction takes place together with the mixing of the reagents. The mixture is then transferred in a pasty state into the reaction furnace.

It is known that a substantially stoichiometric mixture of fluorspar and concentrated sulphuric acid gives, at room temperature, a suspension which separates very easily and it is also known that the suspension may be brought to a muddy or pasty state by performing a part of the reaction, for example, under the influence of a temperature rise.

Such processes avoid only some of the above-mentioned disadvantages since a part of the reaction, and not a negligible one, is carried out in a homogeneous pre-reactor to which it is necessary to bring calories. Indeed, the temperature inside this pre-reactor is moderate, but this factor is contrary to rapid kinetics. Therefore, these processes demand, for an equal production, greater capacity equipment.

Besides, the mechanical means necessary to mix the products of this pre-reactor are exposed to an atmosphere whose corrosive character increases as the temperature rises from room temperature.

At last, it has been proposed to avoid the formation of more or less thick paste which takes place during the reaction of the sulphuric acid on the fluorspar, with the above-mentioned disadvantage, when mixing fluorspar with inert mineral substances, such as calcium sulphate. In the reaction furnace, the sulphuric acid and the fluorspar are introduced at the same time as a quantity of calcium sulphate which is always much superior to the one of the sulphuric acid and the fluorspar. Nevertheless, this technique does not give a full satisfaction. In fact, it does not avoid the above-mentioned drawback with regard to the necessary homogenization of the reaction mixture by mechanical stirring devices. Besides, the thermal exchange coefficient between this latter and the reactor wall is poor, which furthermore requires an increase of the stay of the reaction mixture in the furnace before it reaches the temperature to achieve a practically complete reaction.

My invention relates to a process for producing hydrofluoric acid from concentrated sulphuric acid and fluorspar, in which the sulphuric acid and fluorspar are introduced into a reaction furnace in substantially stoichiometric proportions as a solid mixture. This solid mixture comprises balls or granules obtained from mixing when cold sulphuric acid, crushed fluorspar and an amount of a pulverulent inert product in amount between 50% and 150% by weight of a solid resulting from the reaction. Preferably, the inert product is a powder obtained from anhydrite balls or granules resulting from the reaction.

It is surprising that the addition of such an amount of a chemically inert product, in particular the anhydrite from the reaction, to the sulphuric acid and the fluorspar to be mixed produces granules strong enough to be introduced into the reactor and to keep their form when passing through it. Additionally, this mixture when formed cold experiences little reaction between the sulphuric acid and the fluorspar, namely below 5% and generally about 3%.

In the process of the invention, each ball or granule can function as an independent homogeneous reactor in which evolving of gaseous hydrofluoric acid continues until completion of the reaction. The exterior shape of such a reactor is not altered, though its internal structure changes and its internal porosity which is substantially null at the beginning, increases as the reaction progresses.

The fluorspar granulation is between $5\mu$ and $200\mu$, and preferably between $5\mu$ and $100\mu$, which allows both the use of an enriched ore according to a classic flotation process, and an excellent agglomeration into balls or granules. Likewise, the granulation of the inert product, particularly anhydrite, is advantageously between $5\mu$ and $200\mu$.

It is necessary to carry out the mixing of the reagents and the inert product at the lowest possible temperature, in any case lower than 50° C., and preferably around 15° C. to 20° C., to prevent the reaction from progressing too rapidly and the apparatus wherein the reagents are mixed from being corroded. In particular, when using pulverulent anhydrite obtained by crushing granules from a prior stage of the reaction between sulphuric acid and fluorspar, it is necessary to lower its temperature before adding it to the mixture.

In carrying out the invention, a sintering apparatus is fed with equimolecular amounts of fluorspar and concentrated sulphuric acid, together with anhydrous calcium sulphate in an amount comprised between 50% and 150% of the amount produced by the sulphuric acid and the fluorspar during the reaction. This amount of anhydrite is substantially between about 85% and 260% of the anhydrite proceeding from the reaction between the sulphuric acid and the fluorspar. In this sintering apparatus are formed the granules and balls which are introduced into the reaction furnace. For that purpose, any granulation apparatus may be used, such as rotary plate, drum, mixer, etc.

When operating according to the invention, there is no separation between liquid and solid phases during the reaction, and thus the disadvantages of corrosion are avoided along with all deformation or sticking of the grains. Moreover, such a separation is prejudicial to the reaction kinetics.

The balls or granules obtained when practicing the invention are then treated in a reaction furnace and hydrofluoric acid is emitted therein and then collected. During the acid emission, the balls are transformed into calcium sulphate, while keeping their initial shape. If desired, the balls of anhydrite resulting from the reaction can be crushed and a portion utilized to form new balls. It is preferable to recycle the calcium sulphate from the reaction rather than to use a less calcinated product such as plaster whose texture renders it unsatisfactory in the process of the invention.

In one embodiment of my invention, I introduce the granules composed of the sulphuric acid, fluorspar and anhydrite mixture into a reactor formed by a tight enclosure heated from the outside. This enclosure is subjected to continuous vibrations which impart a subsequent movement to the granules, thereby effecting their advancement through the reactor. This embodiment has an advantage in that there is no direct contact of the mixture by hot gases, thereby avoiding dilution of the hydrofluoric acid produced by the hot gases.

The granules are introduced at one end of the vibrated reactor and progress slowly toward the other end, and their stay in the reactor lasts about 30 minutes and less than 1 hour for a maximum temperature of 250° C. They must stay at least 25 minutes.

The vibrated reactor is substantially filled so that a determined production permits reduction of the capacity of the reactor. Also, its production is limited only by the thermal exchange.

I have found that the thermal exchange coefficient between the reactor wall and the vibrated bed is very high, about the same as the coefficient encountered in a fluidized bed. Also, the thermal conductivity of the bed formed by the granules submitted to the vibrations is similar to that of a fluidized bed. Such characteristics permit use of deep vibrated beds with no risk of heterogeneity in the progression rate of the reaction. Besides this advantage, the reactor is easily tightened and the very low amplitude of the vibrating movements allow its connection to various pipes and conduits by flexible sleeves made of heat- and corrosion-resistant materials. The advancing speed of the balls through the reactor depends upon the amplitude of the vibrations applied to the reactor. Consequently, the amount of time which the balls spend in the reactor is regulated by the amplitude of the vibrations.

Any vibrator may be utilized. The progression of the granules in the reactor is ensured by the vibrations for the furnace axis is substantially horizontal.

It is surprising that during the reaction the granules, although their texture changes all along their travel through the reactor, keep a sufficient hardness to avoid splitting when they are completely transformed into calcium sulphate.

The reactor may be heated by almost any source. However, I prefer an indirect counter-flow heating by hot gases.

The following non-limitative examples illustrate the invention:

*Example 1*

A granulating plate 1.5 m. in diameter and rotating at a speed of 10 turns per minute was fed with a mixture of fluorspar and calcium sulphate, the latter being a residual product from a prior stage of the process. These solids were crushed to a fineness of 100μ. Onto this plate droplets of ordinary concentrated sulphuric acid at 98% were delivered. The obtained balls had an average diameter of 4.5 mm. without any rise in the temperature of the product and they contained sulphuric acid and fluorspar in a molecular ratio of 1.03. Only a very small quantity of hydrofluoric acid was emitted, 2.7% of theoretical quantity. The amounts of each one were respectively: sulphuric acid 131 kg., fluorspar 100 kg. and anhydrite 200 kg.

The plate was placed under a slightly depressive hood connected to an absorption column for hydrofluoric acid. The balls produced by the plate fed a reaction furnace inside which they were heated to 250° C. by the gases from a burner. The gases entered the furnace at the same end as the balls and the other end of the furnace was connected to the absorption column for the hydrofluoric acid produced.

30 minutes was sufficient time to obtain all the hydrofluoric acid from the balls. The calcium sulphate balls had the same shape as those introduced and had not split. The reactor showed no visible sign of corrosion.

*Example 2*

A granulating drum of 3 m. in length and 60 cm. in diameter, provided with a classification device and having a recycling percentage of 55%, was fed with the same products and in the same proportion as in Example 1. The obtained balls, having a wider diameter than 3 mm., were treated under the same conditions as in Example 1. After the reaction, the balls were porous, but still hard, and the reaction was completed after one-half hour at 250° C.

*Example 3*

The process of this example was practiced in apparatus shown schematically by the drawing.

In a first stage, granules composed of a sulphuric acid, fluorspar and anhydrite mixture were formed in an apparatus comprising a granulating plate 1, 1.5 m. in diameter, and rotating at a speed of 10 turns per minute. The plate was supplied with pulverulent fluorspar and crushed anhydrite from a reaction between sulphuric acid and fluorspar by a chute 2 and with concentrated sulphuric acid from a pipe 3. 200 kg. of anhydride per 100 kg. of fluorspar and 127 kg. sulphuric acid at 98% per 300 kg. of the total fluorspar/anhydrite amount were utilized.

From the fluorspar and anhydrite crushed to 100μ size, granules 20 having an average diameter of 4.5 mm. were obtained. These granules were continuously fed to a reactor 4 made from parallelepiped sheet steel 2.5 mm. thick, 3 m. long, 0.05 m. wide, and 0.2 m. high. The reactor was surrounded by a casing 5 of sheet metal, surrounded itself by a heat insulation 6. The casing received hot gases at 500° C. from a source 7 (not shown).

The reactor supported by elastic stretchers 9, 10 was subjected to vibrations of 1 mm. in amplitude by a vibrator 8 formed from an unbalanced one-H.P. motor, connected to the reactor by a rigid bar and a flexible sleeve combination 8a.

The granules were delivered through the end opposite that of the heat introduction into the reactor 4. The evolved hydrofluoric gas was discharged through conduit 11 and the resulting anhydrite through conduit 12. Then, the cooled gases exited through pipe 13.

In operation, the furnace was filled to four-fifths of its volume with the granules which stayed 45 minutes in the reactor. The gases utilized to bring the necessary heat were discharged through pipe 13 at 300° C., whereby the granules were maintained at a temperature near 250° C. for 30 minutes.

The anhydrite (anhydrous calcium sulphate) from the conduit 12 was in the form of granules of small fragility, low density and had an average diameter of 4.3 mm. 99% of the fluorspar was decomposed.

While I have shown and described preferred embodiments of my invnention, it may be otherwise embodied within the scope of the following claims.

I claim:
1. A process for production of hydrofluoric acid by reaction by concentrated sulphuric acid and fluorspar comprising making a solid mixture of balls of concentrated sulphuric acid, fluorspar and anhydrite by mixing crushed fluorspar, concentrated sulphuric acid and crushed anhydrite and forming said balls from the mixed fluorspar, sulphuric acid and anhydrite, said mixing being carried out at a temperautre lower than 50° C., said concentrated sulphuric acid and said fluorspar being in substantially stoichiometric proportions, and said anhydrite being between substantially 85% and 260% by weight of the calcium fluoride in said mixture, feeding said mixture into a reactor and subjecting said mixture to a temperature between substantially 150° C. and 300° C. to obtain gaseous hydrofluoric acid, and recovering said gaseous hydrofluoric acid, said anhydrite imparting strength to said balls sufficient to permit their introduction into said reactor and to substantially maintain their exterior shape in traversing through said reactor, each said ball being an independent homogeneous reactor which evolves gaseous hydrofluoric acid and maintaining substantially its external shape during said traversing while undergoing internal structure changes and increasing in internal porosity during the acid emission reaction.

2. The process of claim 1 characterized by said fluorspar having a granulation of substantially between $5\mu$ and $200\mu$, and by said anhydrite having a granulation substantially between $5\mu$ and $200\mu$.

3. The process of claim 2 characterized by said fluorspar having a granulation between substantially $5\mu$ and $100\mu$.

4. The process of claim 1 characterized by said mixing being carried out at a temperature between substantially 15° C. and 20° C.

5. The process of claim 1 wherein said temperature of substantially 150° C.–300° C. results from exteriorly heating said reactor.

6. The process of claim 1 wherein said solid mixture is subjected to substantially continuous vibrations to form a vibrated bed of said balls moving through said reactor.

7. The process of claim 1 wherein said reactor is substantially filled with said mixture.

8. The process of claim 1 wherein said mixture is in said reactor at least 25 minutes.

9. The process of claim 1 wherein said temperature of substantially 150° C.–300° C. results from exteriorly heating said reactor, and wherein said solid mixture is subjected to substantially continuous vibrations to form a vibrated bed of said balls moving through said reactor.

10. The process of claim 9 wherein said reactor is substantially filled with said mixture.

11 The process of claim 2 wherein said temperature of substantially 150° C.–300° C. results from exteriorly heating said reactor, and wherein said solid mixture is subjected to substantially continuous vibrations to form a vibrated bed of said balls moving through said reactor.

References Cited by the Examiner
UNITED STATES PATENTS

| | | | |
|---|---|---|---|
| 2,018,397 | 10/1935 | Calcott et al. | 23—153 |
| 2,047,210 | 7/1936 | Lawrence | 23—153 |
| 2,932,557 | 4/1960 | List et al. | 23—153 |
| 3,024,123 | 3/1962 | Theilacker et al. | 23—153 X |
| 3,148,037 | 9/1964 | Szego | 23—1 X |

OSCAR R. VERTIZ, *Primary Examiner.*

EDWARD STERN, *Examiner.*